United States Patent [19]

Ozawa et al.

[11] Patent Number: 5,604,561
[45] Date of Patent: Feb. 18, 1997

[54] FOCUS STATE DETECTION DEVICE

[75] Inventors: Masamitsu Ozawa, Kawasaki; Seiichi Yasukawa, Yotsukaido, both of Japan

[73] Assignee: Nikon Corporation, Tokyo, Japan

[21] Appl. No.: 514,729

[22] Filed: Aug. 14, 1995

[30] Foreign Application Priority Data

Sep. 7, 1994  [JP]  Japan .................................. 6-213413

[51] Int. Cl.$^6$ ................................................. G03B 13/36
[52] U.S. Cl. ............................................... 396/96; 396/125
[58] Field of Search ........................... 354/402; 348/229, 348/230, 297, 298, 299; 250/208.1, 201.2, 201.8

[56] References Cited

U.S. PATENT DOCUMENTS 4,340,819  7/1982  Ogasawara et al. .
4,411,505  10/1983  Sakai et al. .

FOREIGN PATENT DOCUMENTS 6-43355  2/1994  Japan .

Primary Examiner—W. B. Perkey
Attorney, Agent, or Firm—Oliff & Berridge

[57] ABSTRACT

A focus state detection device having a shooting lens, a mirror which guides light rays which have passed through the shooting lens to the photoelectric conversion element array, a focus state detection algorithm circuit which detects the focus state of the shooting lens through a focus state detection algorithm on the basis of output signals from the photoelectric conversion element array, and an accumulation control circuit which controls the electric charge accumulation time in the photoelectric conversion element array that, when it is detected by the focus state detection algorithm circuit that the shooting lens is in focus or near focus, the accumulation control circuit conducts accumulation control by fixing the next accumulation time to be the accumulation time at the time when focus or near focus is detected.

19 Claims, 4 Drawing Sheets

FOCUS STATE DETECTION DEVICE

BACKGROUND OF THE INVENTION

The invention relates to a focus state detection device used in a camera or the like.

Conventionally, a method that has been known for focus state detection in an automatic focus state detection device of a camera is the phase-difference detection method, wherein two images having a parallax of the subject are guided to a pair of image sensors, the focus state being determined by computing the relative amount of divergence between the two images from the images output from the pair of image sensors.

This phase difference detection method will be explained with reference to FIG. 4.

Light rays which are incident via region 21 of a shooting lens 1 are focussed on the film equivalent plane 6. The light rays then pass through a focus state detection optical system 8 comprised of a band-pass filter 7, a field mask 2, a field lens 3, an aperture stop 41 and a re-imaging lens 51, and are composed into an image on a sensor array 9A of an image sensor 9. Similarly, light rays which are incident via a region 31 of the shooting lens 1 are focussed on the film equivalent plane 6. The light rays then pass through a focus state detection optical system 8 comprised of a band-pass filter 7, a field mask 2, a field lens 3, an aperture stop 42 and a re-imaging lens 52, and are composed into an image on a sensor array 9B of the image sensor 9.

The size of the region 21 in shooting lens 1 is the same as the inverted projection of the aperture stop 41 through the field lens 3 and, similarly, the size of the region 31 in shooting lens 1 is the same as the inverted projection of the aperture stop 42 through the field lens 3.

The pair of subject images composed on sensor arrays 9A,9B of the image sensor 9 by the focus state detection optical system 8 become mutually farther apart in a so-called front focus state with a clear image of the subject being composed in front of the predicted focus plane by the shooting lens 1 and, conversely, become mutually closer together in a so-called rear focus state with a clear image of the subject being composed behind the predicted focus plane 6.

At the so-called in-focus time, when a clear image of the subject is composed exactly at the predicted focus plane by the shooting lens 1, the subject images on the image sensor arrays 9A and 9B mutually coincide.

Accordingly, an automatic focus state detection device of a phase difference method photoelectrically converts the pair of secondary images of the subject image composed by the focus state detection optical system 8 into electrical signals using the sensor arrays 9A,9b of the image sensor 9. Further, the focus adjustment state of shooting lens 1, herein being the amount of separation from the focus state and the direction of such (hereafter called the defocus amount) can be determined by performing focus state detection correlation algorithm processes on the pair of subject image signals and by finding the relative position of the secondary images of the pair of subject images.

In addition, the subject image signals obtained from the image sensor 9 through photoelectric conversion have differing voltages after photoelectric conversion depending upon the luminosity of the subject. Consequently, it is necessary to control the electric charge accumulation time so that the subject image signal is of a level suitable for focus state detection algorithms, regardless of the subject.

For example, one method of controlling the electric charge accumulation time is known wherein the electric charge accumulation time is controlled so that the peak value of the subject image signal is a predetermined value. Calling Tp the accumulation time of the current accumulation, Pp the peak value of the subject image signal and Pk a predetermined value, the next accumulation time Tq that is to be controlled can be determined from equation 1:

$$Tq = Tp * Pk / Pp. \quad (1)$$

The peak value Pq of the subject image signal accumulated next time with accumulation time Tq is the same as the predetermined value Pk.

However, the following problems arise in electric charge accumulation control in the conventional type of focus state detection device described above.

For example, when the accumulation time is controlled relative to the first subject captured in the focus state detection area so that the peak value of the subject image signal becomes the predetermined value, and after the shooting lens has focussed on the subject which is the first captured, a bright subject enters into the focus state detection area, accumulation is controlled so that the peak value of the subject image signal becomes the predetermined value and, consequently, the peak value of the subject image signal for the entire focus state detection area comes from the portion of the subject image signal received from the high luminosity object, the peak value of the subject image signal of the high luminosity object being controlled so as to be at a suitable level. Consequently, the level of the subject image signal of the subject captured initially in the focus state detection area drops and becomes a value that is not suitable for focus state detection algorithms so that, in essence, focussing is effected relative to the high luminosity object.

On the other hand, when the accumulation time is controlled initially relative to a high luminosity subject so that the peak value of the subject image signal becomes a predetermined value, and after focussing has been effected relative to the initial high luminosity subject, the high luminosity subject leaves and only dark subjects, such as the background or the like, are captured in the focus state detection area, accumulation is controlled so that the peak value of the subject image signal of the dark subject becomes the predetermined value, the accumulation time becoming longer than the accumulation time relative to the high luminosity subject. However, because the accumulation time is controlled so that the peak value of the dark subject becomes the predetermined value, immediately after the high luminosity subject is recaptured in the focus state detection area, the subject image signal of the high luminosity subject is saturated. In addition, in accumulations following this, control is such that this saturation level is considered to be the peak value and, consequently, particularly when the difference in luminosity between the high luminosity subject and the dark subject is large, considerable time is required for the peak value of the subject image signal to reach a suitable level.

Another problem occurs when a light, such as a fluorescent light, is repeatedly turned on and off at a periodic rate, that is, it flickers, which cannot be detected by the naked eye, with electric charge accumulation control there are cases wherein accumulation is conducted in a shorter length of time than a single turning on and off, or flicker, of the fluorescent light. Accordingly, with subjects under fluorescent light, the level of the subject image signal will vary greatly with the timing of accumulation relative to the turning on and off of the fluorescent light when the accumulation time is shorter than a single turning on and off of the fluorescent light.

SUMMARY OF THE INVENTION

In consideration of the foregoing, it is an object of the invention to provide a device which can conduct stable focus state detection.

It is a further object of the invention to provide a stable focus state detection device that can always conduct good accumulation control.

In order to resolve the above-described problems, the invention is to a focus state detection device having a shooting lens, a re-imaging means which guides array light rays which have passed through the shooting lens to the photoelectric conversion element; a focus state detection algorithm means which detects the focus state of the shooting lens through a focus state detection algorithm on the basis of output signals from the photoelectric conversion element array; and an accumulation control means which controls the electric charge accumulation time in the photoelectric conversion element array; wherein when it is detected by the focus state detection algorithm means that the shooting lens is in focus or near focus, the accumulation control means conducts accumulation control by fixing the next accumulation time to be the accumulation time at the time when in focus or near focus is detected. In the invention, when focus state detection is impossible by the focus state detection means for a predetermined number of times or a predetermined length of time, the accumulation control means cancels the accumulation control which has fixed the accumulation time.

For example, the defocus amount can be obtained as follows.

Each of the sensor arrays 9A,9B of the image sensor 9 is structured in such a manner that a plurality of photo-electric conversion elements line-up in one direction. Each of the sensor arrays 9A,9B output a plurality of photo-electric conversion outputs a1 ... an and b1 ... bn corresponding to the number of photoelectric conversion elements in each array. A correlation algorithm is performed while shifting these data strings relatively by a predetermined amount of data. In particular, the following equation 2 is used to compute the correlation amount C(L):

$$C(L) = \sum_{i=k}^{r} |ai - bj| \tag{2}$$

$$j-i=L, L=-L_{max}, \ldots, -2,-1,0,1,2, \ldots, L_{max}$$

Here, L is an integer representing the amount of shift of the data string, as described above, and the first term k and the last term r can be changed depending on the shift mount L. The defocus amount is computed by multiplying the shift amount yielding a relative minimum among the resulting correlation amounts C(L) and a constant determined by the pitch width of the photo-electric conversion element of the image sensor and the optical system.

However, the correlation amounts C(L) assume discrete values and the minimum unit of detectable defocus amount is restricted by the pitch width of the photoelectric conversion elements of the sensor arrays 9A,9B of the image sensor 9. Hence, a method is proposed (see Japanese Unexamined Patent Publication Sho 60-37513) in which more precise focus detection is executed by computing a new relative minimum for the discrete correlation amounts C(L) using an interpolation algorithm. In this method, the defocus amount is determined based on the relative minimum of the correlation amount C(0) and the correlation amounts C(1) and C(-1) computed from the shift amounts at both sides. The shift amount Fm and the defocus amount DF yielding the relative minimum Cex are determined by the following equations:

$$DF = Kf \times Fm; \tag{3}$$
$$Fm = L + DL/E;$$
$$DL = \{C(-1) - C(1)\}/E;$$
$$Cex = C(0) - |DL|; \text{ and}$$
$$E = MAX[ \{C(1) - C(0)\}, \{C(-1) - C(0)\}].$$

Here, Max (ca, Cb) denotes the larger of Ca and Cb, while Kf is a constant determined by the pitch width of the photo-electric conversion elements of the optical system and the image sensor. The defocus amount thus obtained needs to be checked to determine whether it represents a true defocus amount or if it is the result of fluctuations of the correlation amount due to noise and the like. The defocus amount satisfying the following condition is accepted as having a sufficient confidence level:

$$E>E1 \text{ and } Cex/E<G1, \tag{4}$$

where E1 and G1 represent predetermined values respectively. E is a value which depends on the contrast of the subject. As the value of E becomes larger, the contrast becomes larger and the confidence level becomes higher. Cex/E depends on the coincidence level of the images, and the closer it is to 0, the higher the confidence level becomes. When a defocus amount is accepted as having a sufficient confidence level, the shooting lens 1 is driven based on the defocus amount DF.

In the invention described above, the accumulation time is fixed when it is determined that the focus state of the shooting lens is in-focus or near-focus and, consequently, even when a subject with a large difference in luminosity enters the focus state detection area, the accumulation time is controlled so that the subject image signal achieves a suitable level. Further, the accumulation control which fixes the accumulation time is removed when focus state detection is impossible by the focus state detection algorithm means for a predetermined number of times or for a predetermined length of time and, consequently, it is possible to react quickly when the luminosity of the subject changes because of a change in composition or the like.

Alternatively, the invention is to a focus state detection device having a shooting lens; a re-imaging means which guides light rays which have passed through the shooting lens to the photoelectric conversion element array; a focus state detection algorithm means which detects the focus state of the shooting lens through a focus state detection algorithm on the basis of output signals from the photoelectric conversion element array; and an accumulation control means which controls the electric charge accumulation time in the photoelectric conversion element array, wherein when the focus state detection algorithm means detects that the shooting lens is in focus or near focus, the accumulation control means conducts accumulation control so that the next accumulation time is not changed by more than a predetermined length of time from the accumulation time when the in-focus or near-focus condition was detected.

In the invention, when focus state detection is impossible by the focus state detection means for a predetermined number of times or a predetermined length of time, the accumulation control means cancels the accumulation control which does not cause a change of greater than a predetermined time interval.

In the invention the predetermined length of time is determined on the basis of the accumulation time when the in-focus or near-focus condition was detected.

Using the invention, it is possible to react even when the luminosity of the subject in focus changes somewhat or when the luminosity of the subject changes because of a change in the composition or the like.

In this way, with the invention it is possible to provide an extremely stable focus state detection device.

BRIEF DESCRIPTION OF THE DRAWINGS

The invention will be described with reference to the drawings in which.

DESCRIPTION OF THE PREFERRED EMBODIMENTS

Figure 3:
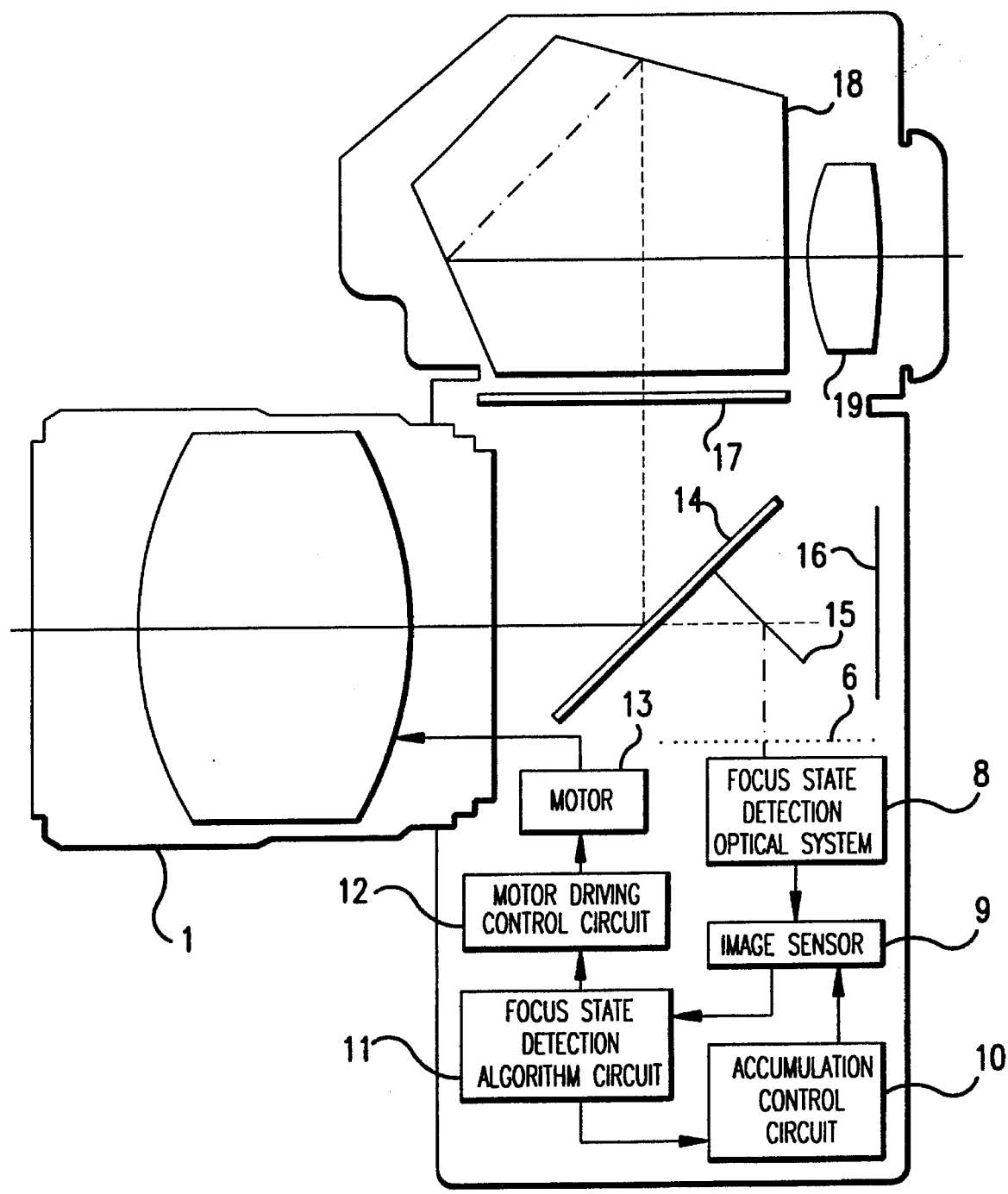
FIG. 3 is a schematic drawing of the structure of the embodiments of the invention.

FIG. 3 is a cross-sectional view of a single lens reflex camera equipped with a focus state detection device, the drawing shows a state wherein a shooting lens 1 is mounted.

Figure 4:
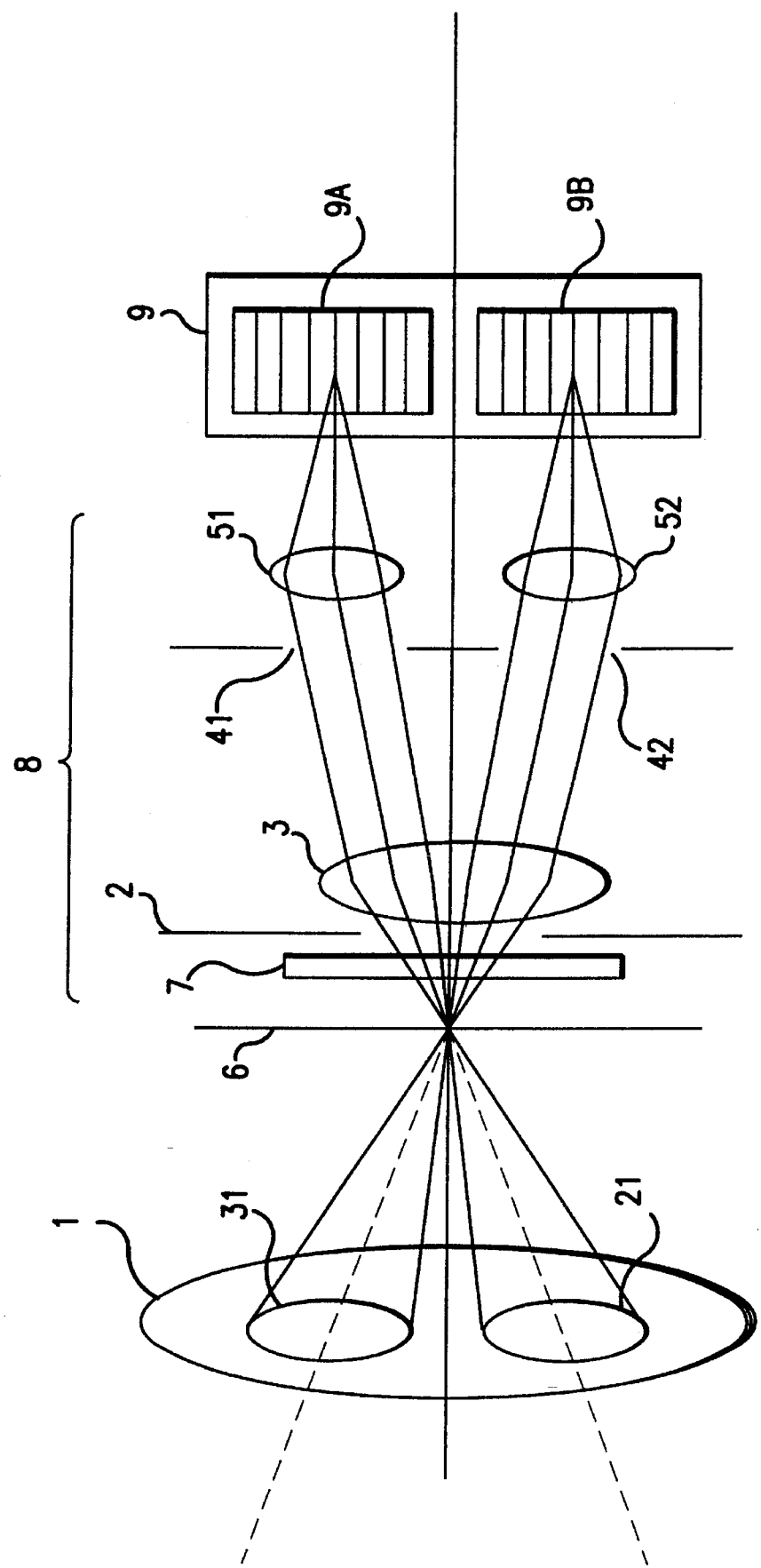
FIG. 4 is a drawing showing the optical system and image sensor of a focus state detection device of a phase difference method.

In FIG. 3, reference number 10 designates an accumulation control circuit, reference number 11 designates a focus state detection algorithm circuit, reference number 12 designates a motor driving control circuit, reference number 13 designates a motor, reference number 14 designates a main mirror, reference number 15 designates an auxiliary mirror, reference number 16 designates a film plane, reference number 17 designates a viewfinder screen, reference number 18 designates a pentagonal prism, and reference number 19 designates an eyepiece lens. In addition, components that are the same as those in previously described FIG. 4 are labeled with the same reference numbers.

Light rays from the subject which have passed through the shooting lens 1 are deflected upwards by the main mirror 14 and are guided to a viewfinder optical system comprised of the viewfinder screen 17, the pentagonal prism 18, and the eyepiece lens 19.

Photosensitive film is positioned at the film plane 16 positioned behind the main mirror 14. During photography, the main mirror 14 and the auxiliary mirror 15 withdraw from the optical path between the shooting lens 1 and the film plane 16 so that light rays from the subject, passing through the shooting lens 1, expose the photosensitive film positioned at the film plane 16.

In addition, part of main mirror 14 is semi-transparent. The auxiliary mirror 15 is mounted behind the semi-transparent part. The main mirror 14, in addition to guiding light rays from the subject, and passing through the shooting lens 1, to the viewfinder optical system by deflecting the light rays upward, also deflects light rays from the subject which have passed through the semi-transparent part of main mirror 14 toward the bottom of the camera body using auxiliary mirror 15. The light deflected by auxiliary mirror 14 is guided to the focus state detection optical system 8 positioned near the film equivalent plane 6 of the shooting lens 1. Further, light rays from the subject pass through the focus state detection optical system 8 and are guided to electric charge accumulation type image sensor 9. The focus state detection optical system 8 and the image sensor 9 are configured so that focus state detection is possible in the focus state detection area established on the photo field.

The image sensor 9 photoelectrically converts secondary images of the subject image formed on sensor arrays 9A,9B, and outputs an electrical subject image signal corresponding to the distribution of light intensity in the subject image. The subject image signal is sent to the focus state detection algorithm circuit 11. The focus state detection algorithm circuit 11 processes the subject image signal, using, for example, the previously described focus state detection algorithm, and computes a defocus amount between the imaging plane of shooting lens 1 and film equivalent plane 6.

In addition, the motor driving control circuit 12 controls the amount of driving and the direction of driving of the motor 13 on the basis of the defocus amount computed by focus state detection algorithm circuit 11. The motor 13 is mechanically linked to the shooting lens 1 and effects focussing of the shooting lens 1. The driving amount and driving speed of the motor are controlled by the motor driving control circuit 12.

The accumulation control circuit 10 receives, from the focus state detection algorithm circuit 11, the focus state of the shooting lens and information about the subject image signal, determines the accumulation time, and simultaneously controls the electric charge accumulation time in sensor arrays 9A,9B of the image sensor 9.

The above description is of a configuration common to the embodiments of the invention. Hereafter the embodiments for accumulation control in the focus state detection actions of the invention are described.

Figure 1:
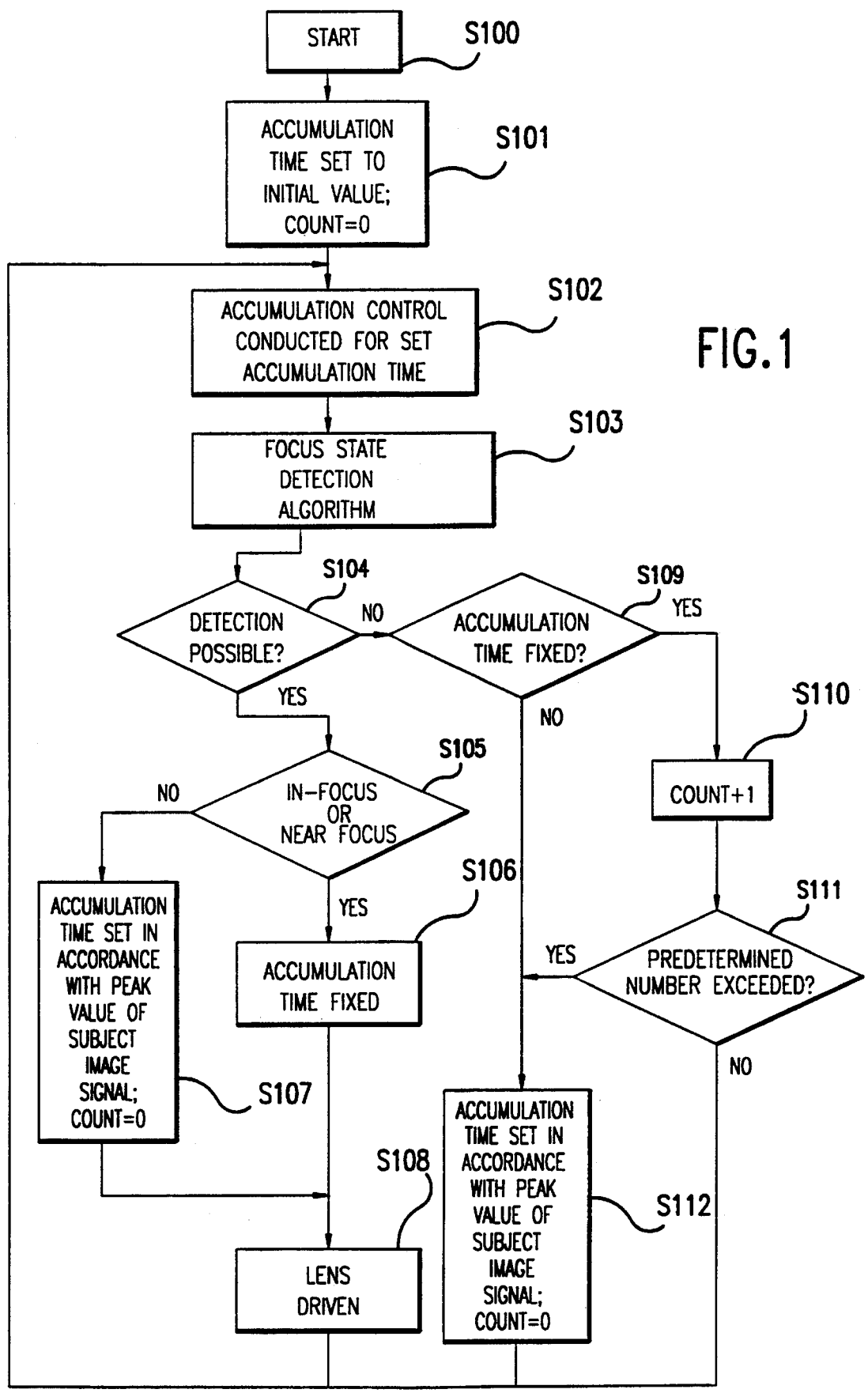
FIG. 1 is a flowchart showing a first embodiment of the invention.

FIG. 1 is a flowchart showing the focus state detection control actions by the focus state detection algorithm circuit 11 in a first embodiment of the invention. In step S100, the power source is turned ON using a power source switch (not shown) and the focus state detection actions are started by a release button (not shown) being depressed halfway. The program then moves to step S101.

In step S101, because no previous subject image signal exists immediately following the start of the focus state detection actions, the accumulation time is set to an initial value by the accumulation control circuit 10 and the count is set to 0. In step S102, the accumulation time in the image sensor 9 is controlled using the accumulation time established by the accumulation control circuit 10.

In step S103, the focus state detection algorithm circuit 11 reads the subject image signal output from the image sensor 9 and processes the signal. The focus state detection algorithm circuit 11 then outputs a defocus amount of the shooting lens 1.

In step S104, a determination is made whether the defocus amount computed in step S103 has a high level of confidence. When focus state detection is possible because a high level of confidence is determined to exist, the program moves to step S105, while when focus state detection is impossible because a high level of confidence is determined not to exist, the program moves to step S109.

When the determination in step S104 is yes, then in step S105, a determination is made whether the focus state of the shooting lens 1 is in-focus or near-focus. When the focus state of the shooting lens 1 is in-focus or near-focus, step S106 follows, while when the focus state of shooting lens 1 is not in-focus or not near-focus, step S107 is executed.

When the focus state is in-focus or near-focus, in step S106, the accumulation times starting with the next time are set to be the same accumulation time as the current accumulation time. In other words, the accumulation time is fixed.

Accordingly, even if a situation arises which has an effect on the accumulation control, such as a subject having a large difference in luminosity entering into the focus state detection area, the next accumulation time is controlled so that the subject image signal achieves a suitable level at the luminosity of the subject that has been determined to be once in-focus or near-focus. Following the setting of the accumulation time in step S106, the program moves to step S108.

Conversely, when the focus state is not in-focus or near-focus, in step S107, the next accumulation time is set by the accumulation control circuit 10 to an accumulation time in accordance with the peak value of the subject image signal on the basis of equation 1. In addition, the count is set to 0, and step S108 is executed.

In step S108, the shooting lens 1 is driven to the focus position, using the motor 13, by the motor driving control circuit 12 on the basis of the computed defocus amount, and the program then returns to step S102 and repeats the focus state detection actions.

When, in step S104, it was determined detection is not possible, in step S109, a determination is made whether the control of accumulation is conducted with a fixed accumulation time. When the electric charge accumulation is conducted with a fixed accumulation time, step S110 is executed, otherwise step S112 is executed. In step S110, the number of times that accumulation control has been conducted with the fixed accumulation time, while the focus state detection is impossible, is incremented.

In step S111, a determination is made whether the number of times that accumulation control has been conducted with a fixed accumulation time while focus state detection is impossible has exceeded a predetermined number. When the predetermined number has not been exceeded, step S102 is executed, and when the focus state detection actions have been repeated and the predetermined number has been exceeded, step S112 is executed.

When the accumulation time is not fixed or the count has exceeded the predetermined number then, in step S112, the next accumulation time is set by the accumulation control circuit 10 to an accumulation time in accordance with the peak value of the subject image signal on the basis of equation 1. In addition, the count is set to 0, and the program then returns to step S102 to repeat the focus state detection actions. Accordingly, when the impossibility of detection has continued for a predetermined number of times for the focus state detection algorithm of a subject image signal obtained through accumulation control in which the accumulation time has been fixed, the accumulation time is set in accordance with the peak value of the subject image signal and, consequently, it is possible to effect accumulation control in which the subject image signal reaches a suitable level quickly even when the subject luminosity changes through alterations in composition of the focus state detection area or the like.

Figure 2:
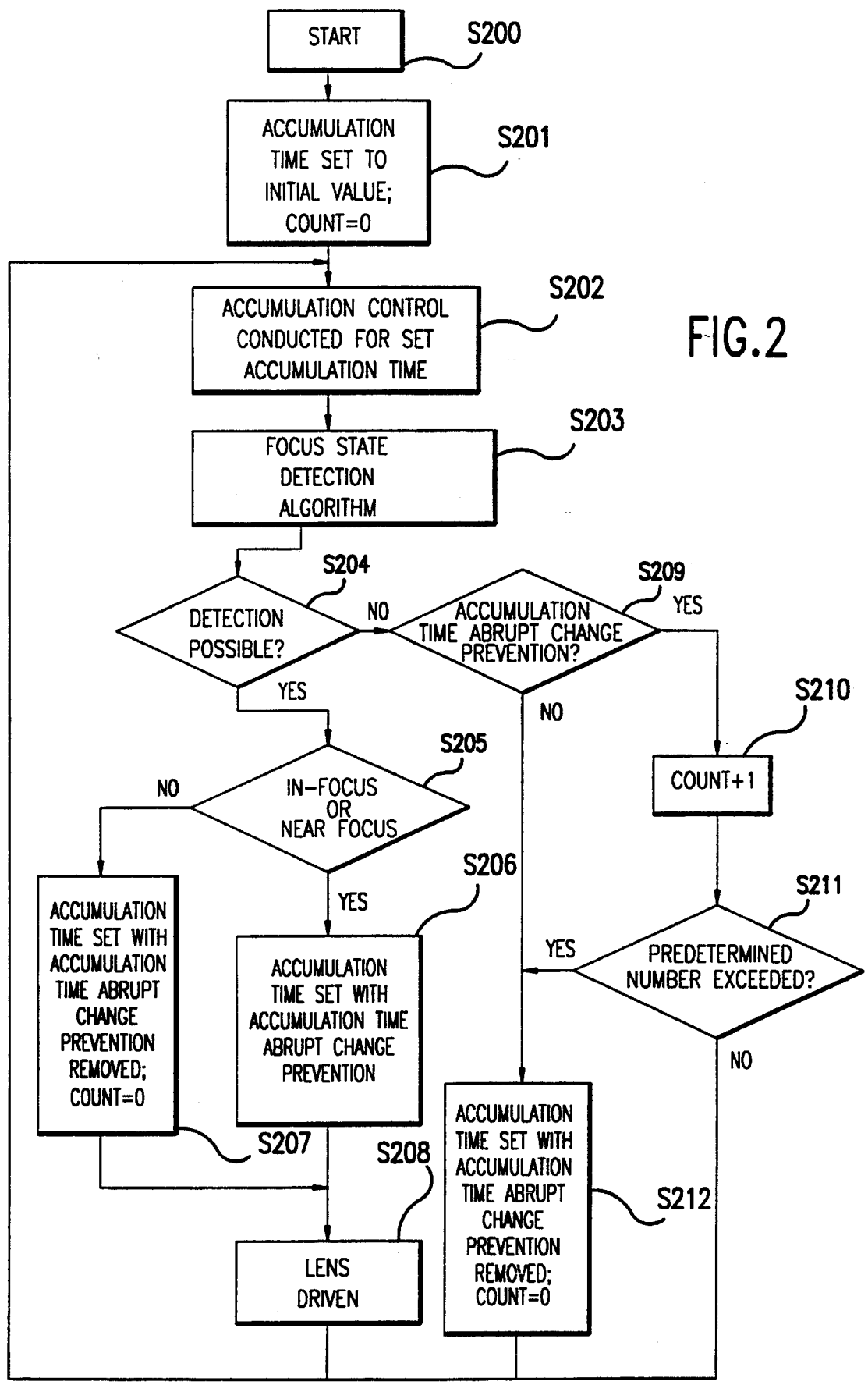
FIG. 2 is a flowchart showing a second embodiment of the invention.

FIG. 2 is a flowchart showing the focus state detection control actions by the focus state detection algorithm circuit 11 in a second embodiment of the invention.

In step S200, the power source is turned ON using a power source switch (not shown) and the focus state detection actions are started by depressing a release button (not shown) halfway. Step S201 is then executed. In step S201, because no previous subject image signal exists immediately following the start of focus state detection actions, the accumulation time is set to an initial value by accumulation control circuit 10 and the count is set to 0. In step S202, the accumulation time in the image sensor 9 is controlled using the accumulation time established by the accumulation control circuit 10.

In step S203, the focus state detection algorithm circuit 11 reads the subject image signal from the image sensor 9 and processes the signal. The focus state detection algorithm circuit 11 then outputs a defocus amount for the shooting lens 1. In step S204, a determination is made whether the defocus amount computed in step S203 has a high level of confidence. When focus state detection is possible because a high level of confidence is determined to exist, step S205 is executed, and when focus state detection is impossible because a high level of confidence is determined not to exist, step S209 is executed.

When the detection is possible, then in step S205, a determination is made whether the focus state of the shooting lens 1 is in-focus or near-focus. When the focus state of the shooting lens 1 is in-focus or near-focus, step S206 is executed. However, when the focus state of the shooting lens 1 is not in-focus or not near-focus, step S207 is executed. In step S206, the accumulation times starting with the next time are set to be the same accumulation time as the current accumulation time but, in this embodiment, abrupt changes in the accumulation time are prevented. That is to say, the next accumulation time determined by above-described equation 1 is limited by the following condition equations.

In the following equations 5, 6 and 7, Tp is the accumulation time of the current accumulation, Tq is the accumulation time of the next accumulation and $\alpha 1$ and $\alpha 2$ are predetermined values that are positive real numbers.

$$\text{When } Tq \leq Tp^*\alpha 1, \text{ then } Tq = Tp^*\alpha 1. \tag{5}$$

$$\text{When } Tp^*\alpha 1 > Tq > Tp^*(1-1/\alpha 2), Tq \text{ is the value given by equation 1.} \tag{6}$$

$$\text{When } Tp^*(1-1/\alpha 2) \leq Tq, \text{ then } Tp^*(1-1/\alpha 2) = Tq. \tag{7}$$

Here, predetermined values $\alpha 1$ and $\alpha 2$ are determined as follows, for example. Suppose that accumulation is controlled so that half of the level of the dynamic range of the image sensor 9 is a suitable level for the focus state detection algorithm. When accumulation is conducted with an accumulation time at least as long as twice the accumulation time, the output from the image sensor 9 exceeds the dynamic range. Here, with equation 5, the accumulation time is limited so that the dynamic range is not exceeded. In addition, if half the level of the dynamic range is the suitable value for the focus state detection algorithm, a1 is a positive real number smaller than 2.

Further, if the output level from the image sensor 9 is too low, the information amount concerning luminosity distribution in the subject becomes sparse and it becomes difficult to conduct good focus state detection. Here, with equation 7, the output level from the image sensor 9 is limited so that the level does not become too low. In addition, if half the level of the dynamic range is a suitable level for the focus state detection algorithm, it is preferable for $\alpha 2$ to be a positive real number larger than 4 in order to guarantee, to a certain degree, the output level from the image sensor 9.

Accordingly, even if a situation arises which has an effect on the accumulation control, such as a subject having a large difference in luminosity entering into the focus state detection area, the next accumulation time is controlled so that the subject image signal achieves a suitable level at the luminosity of the subject that has been determined to be once in-focus or near-focus. Following the setting of the accumulation time, the program moves to step S208.

On the other hand, when the focus state is not in-focus or near-focus, in step S207, the next accumulation time is set by accumulation control circuit 10 to an accumulation time in accordance with the peak value of the subject image signal. In this event, the accumulation time abrupt change prevention conducted in step S206 is not conducted. In addition, the count is set to 0 and step S208 is then executed.

In step S208, the shooting lens 1 is driven to the focus position, using the motor 13, by the motor driving control circuit 12 on the basis of the computed defocus amount and the program then returns to step S202 to repeat the focus state detection actions.

If at step S204, detection is not possible, in step S209, a determination is made whether the control of accumulation is conducted with the accumulation time set using accumulation time abrupt change prevention. When accumulation is conducted with the accumulation time set using accumulation time abrupt change prevention, step S210 is executed, and when it is not, step S212 is executed.

In step S210, the count of the number of times that accumulation control has been conducted with the accumulation time set using accumulation time abrupt change prevention while focus state detection is impossible is incremented.

In step S211, a determination is made whether the number of times that accumulation control has been conducted with the accumulation time set using accumulation time abrupt change prevention while focus state detection is impossible has exceeded a predetermined number. When the predetermined number has not been exceeded, step S202 is executed, and when the focus state detection actions have been repeated and the predetermined number has been exceeded, step S212 is executed.

In step S212, when the predetermined number has been exceeded, the accumulation times starting with the next time are set by the accumulation control circuit 10 to an accumulation time in accordance with the peak value of the subject image signal. At this time, the accumulation time abrupt change prevention executed in step S206 is not executed. In addition, the count is set to 0, and the program then returns to step S202 to repeat the focus state detection actions.

Accordingly, when the impossibility of detection has continued for a predetermined number of times for the focus state detection algorithm of a subject image signal obtained through accumulation control in which the accumulation time has been set using accumulation time abrupt change prevention, the accumulation time is set in accordance with the peak value of the subject image signal and, consequently, it is possible to effect accumulation control in which the subject image signal reaches a suitable level quickly even when the subject luminosity changes through alterations in composition of the focus state detection area or the like.

In addition, with this second embodiment, even if a subject other than the subject being focussed on enters into the focus state detection area, the other subject having a large difference in luminosity, an abrupt accumulation time change is prevented and, consequently, good accumulation control is possible relative to the subject that is supposed to be focussed on. In addition, accumulation control is not conducted which fixes the accumulation time after the focus state of the shooting lens is once determined to be in-focus or near-focus, but accumulation control is conducted which permits a change in the accumulation time within a certain range and, consequently, even when the subject luminosity changes, the accumulation time changes accompanying the change in luminosity so that it is possible at all times to conduct good accumulation control.

In the above-described embodiments, in the case where focus state detection is impossible under accumulation control which fixes the accumulation time and in the case where focus state detection is impossible under accumulation control which prevents abrupt changes in the accumulation time, the number of times when focus state detection is impossible is counted and, when a predetermined number is exceeded, accumulation control is conducted in which the peak value of the subject image signal becomes a predetermined value. As an alternative, it is also acceptable to not count the number of times that focus state detection is impossible, but rather to measure the length of time during which focus state detection is impossible.

In other words, in the above-described embodiments, it would also be acceptable for the length of time during which focus state detection is impossible to be measured in the case where focus state detection is impossible under accumulation control which fixes the accumulation time and in the case where focus state detection is impossible under accumulation control which prevents abrupt changes in the accumulation time and, when the predetermined length of time is exceeded, to conduct accumulation control in which the peak value of the subject image signal becomes a predetermined value. With the method wherein the number of times focus state detection is impossible is counted and accumulation control is changed when a predetermined number is exceeded, the length of the accumulation time, that is to say, the degree of luminosity of the subject, will greatly effect the length of time focus state detection is impossible. However, by measuring the length of time during which focus state detection is impossible using a time interval and changing accumulation control after a certain length of time, the result is obtained that accumulation control is always conducted at a constant time interval regardless of the luminosity of the subject.

In addition, in the above-described embodiments, an accumulation control method is conducted wherein the peak value of the subject image signal becomes a predetermined value, but it is possible to obtain the efficacy of the invention even when using other commonly known accumulation control methods, such as an accumulation control method using a photometry algorithm value.

What is claimed is:

1. A focus state detection device, comprising:

a shooting lens;

re-imaging means for guiding array light rays which have passed through the shooting lens to a photoelectric conversion element array;

focus state detection algorithm means for detecting a focus state of the shooting lens through a focus state detection algorithm on the basis of output signals from the photoelectric conversion element array; and accumulation control means for controlling the electric charge accumulation time in the photoelectric conversion element array, wherein when it is detected by the focus state detection algorithm means that the shooting lens is in focus or near focus, the accumulation control means conducts accumulation control by fixing a next accumulation time to be the accumulation time at the time when focus or near focus is detected.

2. The focus state detection device according to claim 1, wherein when focus state detection impossibility by the focus state detection algorithm means continues for a predetermined number of times, the accumulation control means removes accumulation control which has fixed the accumulation time.

3. The focus state detection device according to claim 1, wherein when focus state detection impossibility by the focus state detection algorithm means continues for a predetermined length of time, the accumulation control means removes accumulation control which has fixed the accumulation time.

4. A focus state detection device, comprising:

a shooting lens;

re-imaging means for guiding to a photoelectric conversion element array light rays which have passed through the shooting lens;

focus state detection algorithm means for detecting a focus state of the shooting lens through a focus state detection algorithm on the basis of output signals from the photoelectric conversion element array; and accumulation control means for controlling the electric charge accumulation time in the photoelectric conversion element array, wherein when it is detected by the focus state detection algorithm means that the shooting lens is in focus or near focus, the accumulation control means conducts accumulation control so that a next accumulation time is not changed by more than a predetermined length of time from the accumulation time when focus or near focus was detected.

5. The focus state detection device according to claim 4, wherein when focus state detection impossibility by the focus state detection algorithm means continues for a predetermined number of times, the accumulation control means removes accumulation control which does not cause a change of greater than a predetermined time interval.

6. The focus state detection device according to claim 4, wherein when focus state detection impossibility by the focus state detection algorithm means continues for a predetermined length of time, the accumulation control means removes accumulation control which does not cause a change of greater than a predetermined time interval.

7. The focus state detection device according to claim 4, wherein the predetermined length of time is determined on the basis of the accumulation time when in-focus or near-focus was detected.

8. A focus state detection device, comprising:

a lens for passing light rays;

a focus state detection optical system;

a photoelectric conversion element array for receiving light rays from said lens through said focus state detection optical system;

a focus state detection algorithm circuit for determining a focus state of the shooting lens on the basis of output signals from said photoelectric conversion element array;

an accumulation control circuit for controlling the electric charge accumulation time in said photoelectric conversion element array, wherein when said focus state detection algorithm circuit determines said shooting lens is in an in-focus or near-focus condition, said accumulation control circuit performs accumulation control for a next accumulation time that is consistent with the accumulation time at the time when focus or near focus is detected.

9. The focus state detection device according to claim 8, wherein the consistency comprises fixing the next accumulation time to be the accumulation time at the time when the in-focus or near-focus condition was detected.

10. The focus state detection device according to claim 8, wherein the consistency comprises preventing the next accumulation time from being changed by more than a predetermined length of time from the accumulation time when the in-focus or near-focus condition was detected.

11. The focus state detection device according to claim 8, wherein the focus state detection algorithm circuit further determines when focus state detection is impossible and accumulation time consistency is in effect, and when such occurs for more than a predetermined period, the accumulation control circuit discontinues accumulation control maintaining a consistent accumulation time.

12. The focus state detection device according to claim 11, wherein the predetermined period is measured as a count of the number of checks to determine focus state detection since detection became impossible.

13. The focus state detection device according to claim 11, wherein the predetermined period is measured as a period of time since focus state detection became impossible.

14. A method of focus control, comprising the steps of:

initiating focus state detection;

setting an accumulation time to establish an initial value;

controlling the accumulation time in an image sensor to the established accumulation time;

determining a defocus amount based on output signals from the image sensor;

determining whether focus state detection is possible based on a level of confidence for the defocus amount; and when focus state detection is possible, determining whether an in-focus or near-focus state exists; and when focus state detection is impossible, determining whether a next accumulation time is to be consistent with the established accumulation time.

15. The method according to claim 14, wherein after the step of determining whether an in-focus or near-focus state exists, when such a state exists, further comprising a step of establishing an accumulation time consistent with the established accumulation time; and when such a states does not exist, further comprising a step of resetting the accumulation time based on detected conditions to establish a new value.

16. The method according to claim 14, wherein consistency is obtained between the next accumulation time and the established accumulation time by one of fixing the accumulation time and preventing an abrupt change in the accumulation time.

17. The method according to claim 14, wherein when in the step of determining whether a next accumulation time is to be consistent such is found to be true, further comprising the steps of:

determined the period detection has been impossible; and determining whether a predetermined period has been exceeded.

18. The method according to claim 17, wherein the predetermined period may be one of a count of status checks and a length of time.

19. The method according to claim 14, wherein when a one of the next accumulation time is not to be consistent with the established accumulation time and when the next accumulation time is to be consistent with the established accumulation time but the predetermined period has passed, further comprising a step of resetting the accumulation time based on detected conditions to establish a new value.

* * * * *